(12) United States Patent
Ishioka et al.

(10) Patent No.: US 7,794,344 B2
(45) Date of Patent: Sep. 14, 2010

(54) CONTINUOUSLY-VARIABLE-TRANSMISSION CONTROL DEVICE AND STRADDLE-TYPE VEHICLE

(75) Inventors: Kazutoshi Ishioka, Shizuoka (JP); Takeharu Noguchi, Shizuoka (JP)

(73) Assignee: Yamaha Hatsudoki Kabushiki Kaisha, Iwata-Shi (JP)

(*) Notice: Subject to any disclaimer, the term of this patent is extended or adjusted under 35 U.S.C. 154(b) by 464 days.

(21) Appl. No.: 11/623,675

(22) Filed: Jan. 16, 2007

(65) Prior Publication Data
US 2007/0197321 A1    Aug. 23, 2007

(30) Foreign Application Priority Data
Jan. 16, 2006   (JP)  ............... 2006-007655

(51) Int. Cl.
  *F16H 59/00*   (2006.01)
  *F16H 55/56*   (2006.01)
  *G06F 7/00*    (2006.01)
  *G06F 17/00*   (2006.01)

(52) U.S. Cl. .................. 474/28; 474/8; 701/58

(58) Field of Classification Search ............. 474/8–46; 701/29, 51, 58, 60
See application file for complete search history.

(56) References Cited
U.S. PATENT DOCUMENTS 4,458,558 A  *  7/1984  Frank ................ 74/665 GE
5,182,968 A        2/1993  Mott
6,126,138 A       10/2000  Tsai
6,764,421 B2 *    7/2004  Onogi ................ 474/46
2002/0156557 A1 * 10/2002  Gras .................. 701/29

FOREIGN PATENT DOCUMENTS
JP   06-249329    9/1994

OTHER PUBLICATIONS
European Search Report for corresponding European application No. 07000805.7.
* cited by examiner

*Primary Examiner*—John Q Nguyen
*Assistant Examiner*—Robert T Reese
(74) *Attorney, Agent, or Firm*—Rabin & Berdo, PC

(57) ABSTRACT

A continuously-variable-transmission control device having high control response and stability, reduced processing load on a control device and V-belt wear recognition. The width of the V-belt is calculated on the basis of a position of the primary sheave, a length of the V-belt, a distance between the sheaves, an angle of the sheave, and a change gear ratio during idling, and the calculated belt width is stored. The control device performs a feed-forward control on the starter in which it corrects the target position of the primary sheave on the basis of the belt width, and then controls the sheave position so as to reach the corrected target position. When the calculated belt width becomes equal to or smaller than a predetermined threshold, the control device issues an alarm that alerts the driver to replace the V-belt.

12 Claims, 13 Drawing Sheets

[Fig. 1]
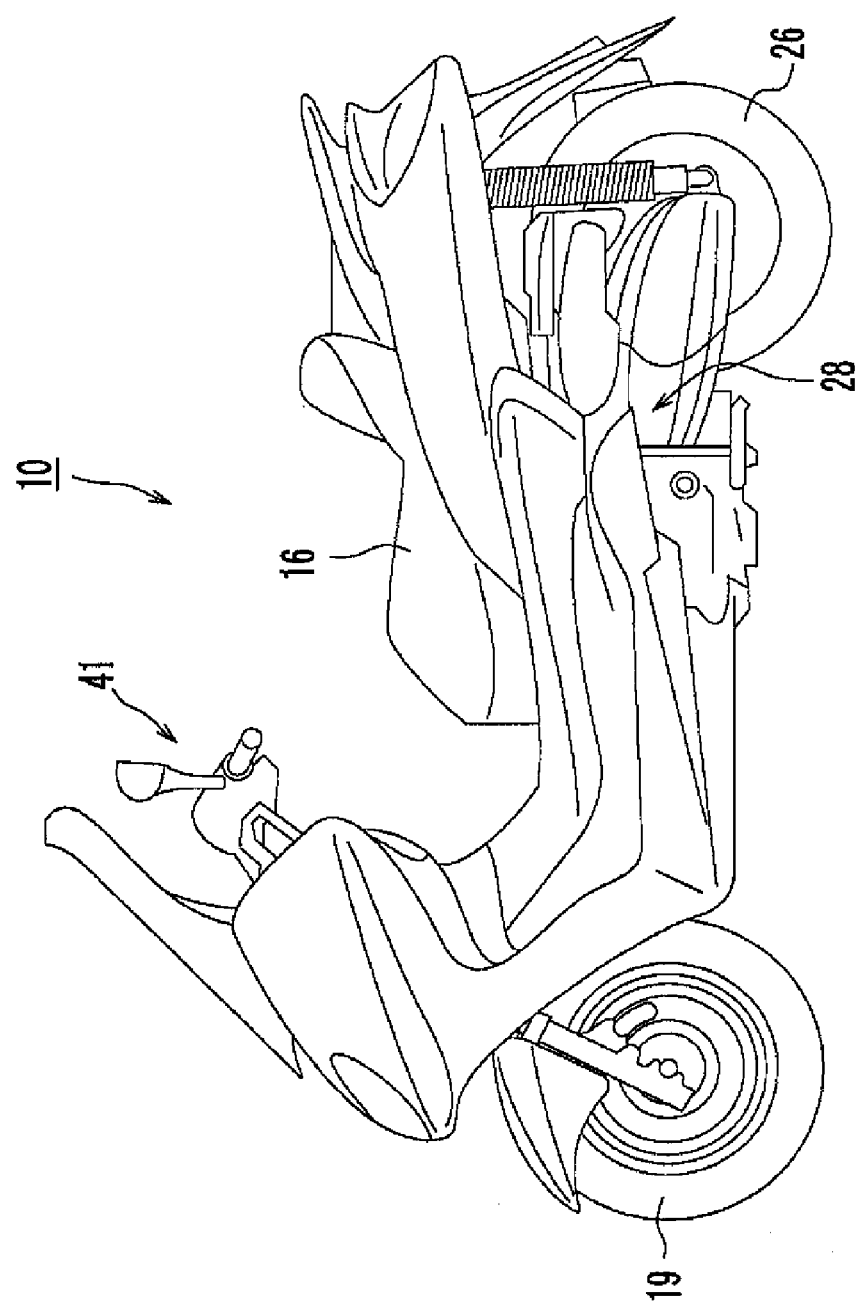

[Fig. 2]
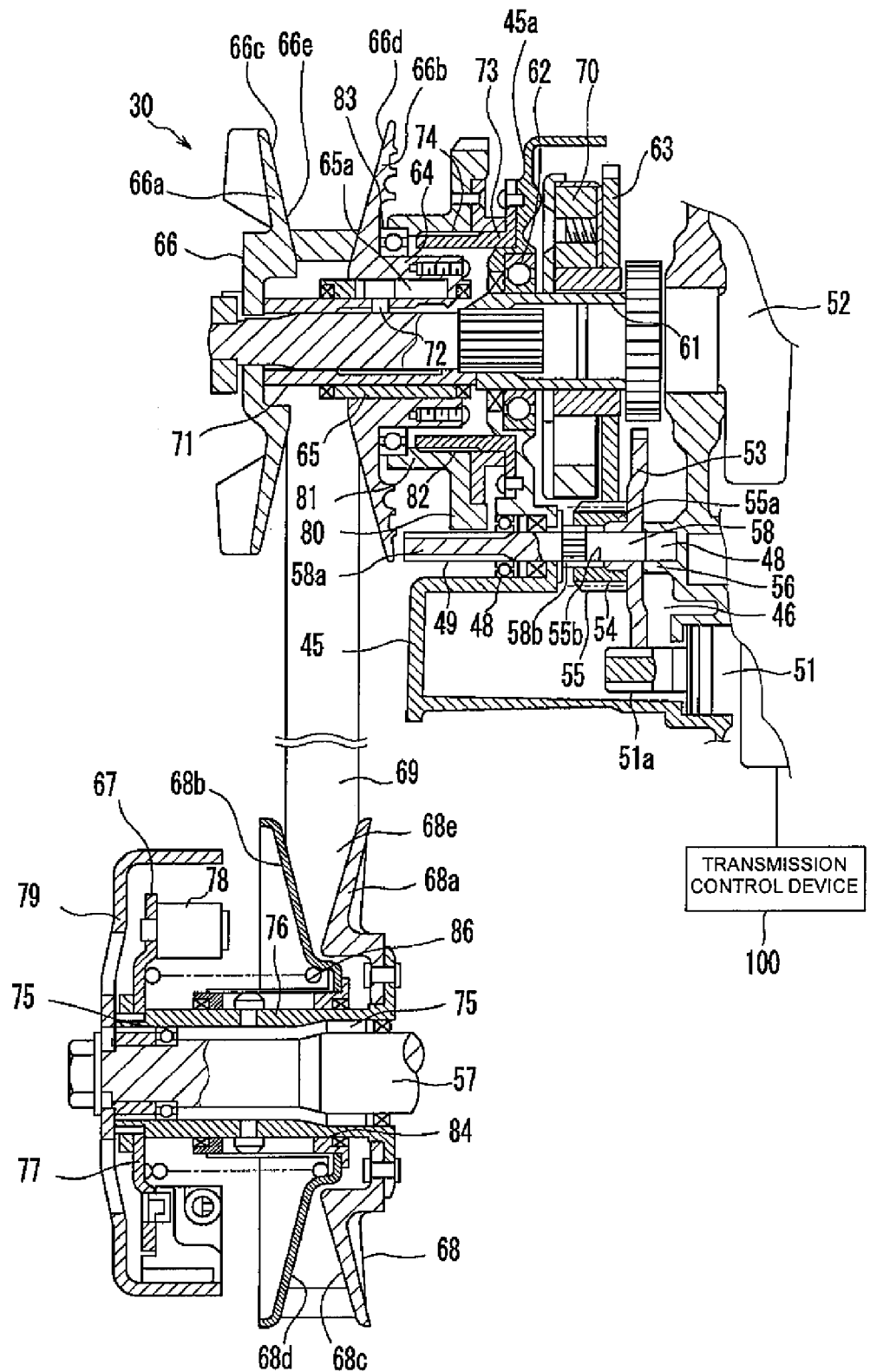

[Fig. 3]
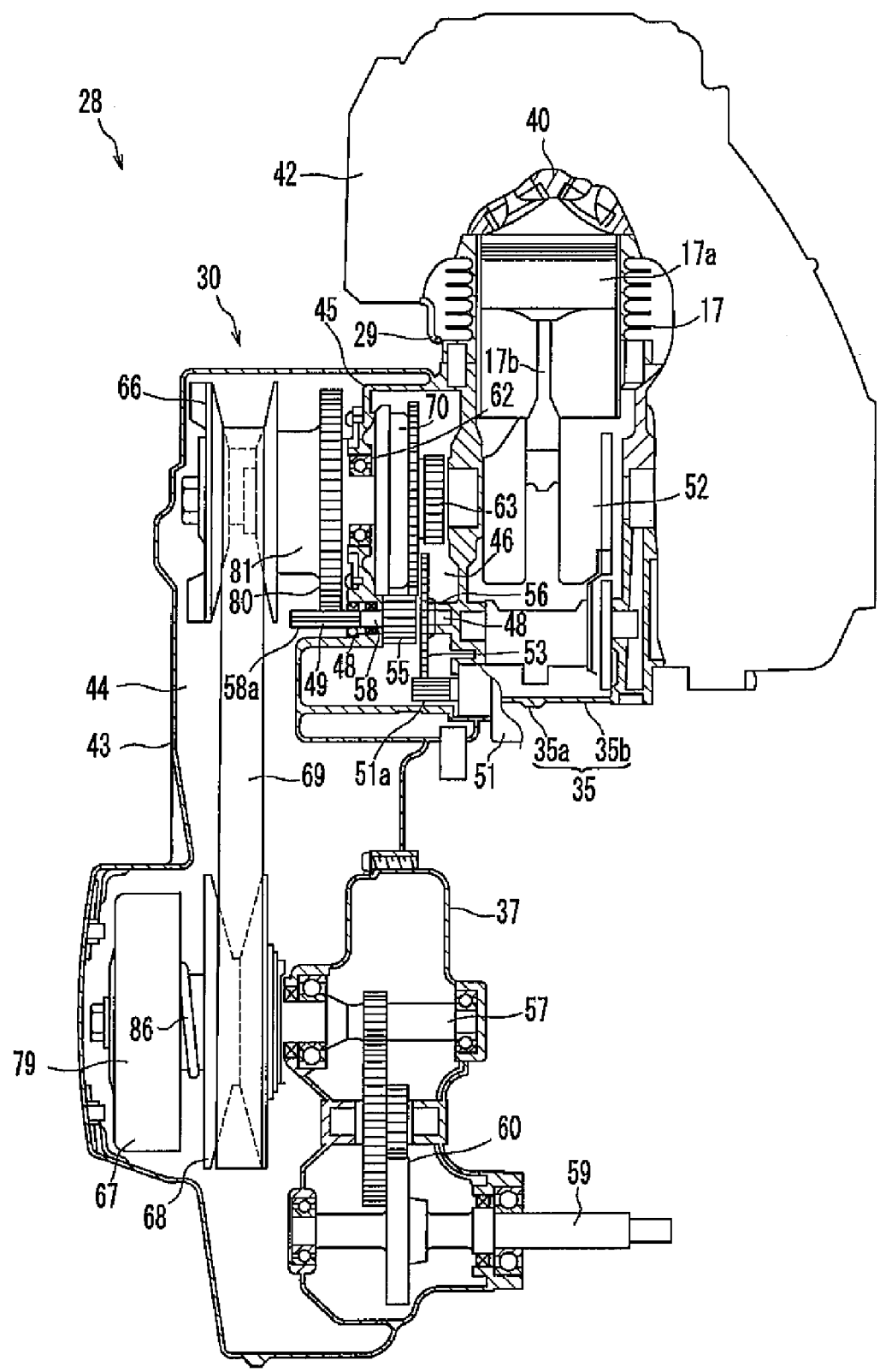

[Fig. 4]
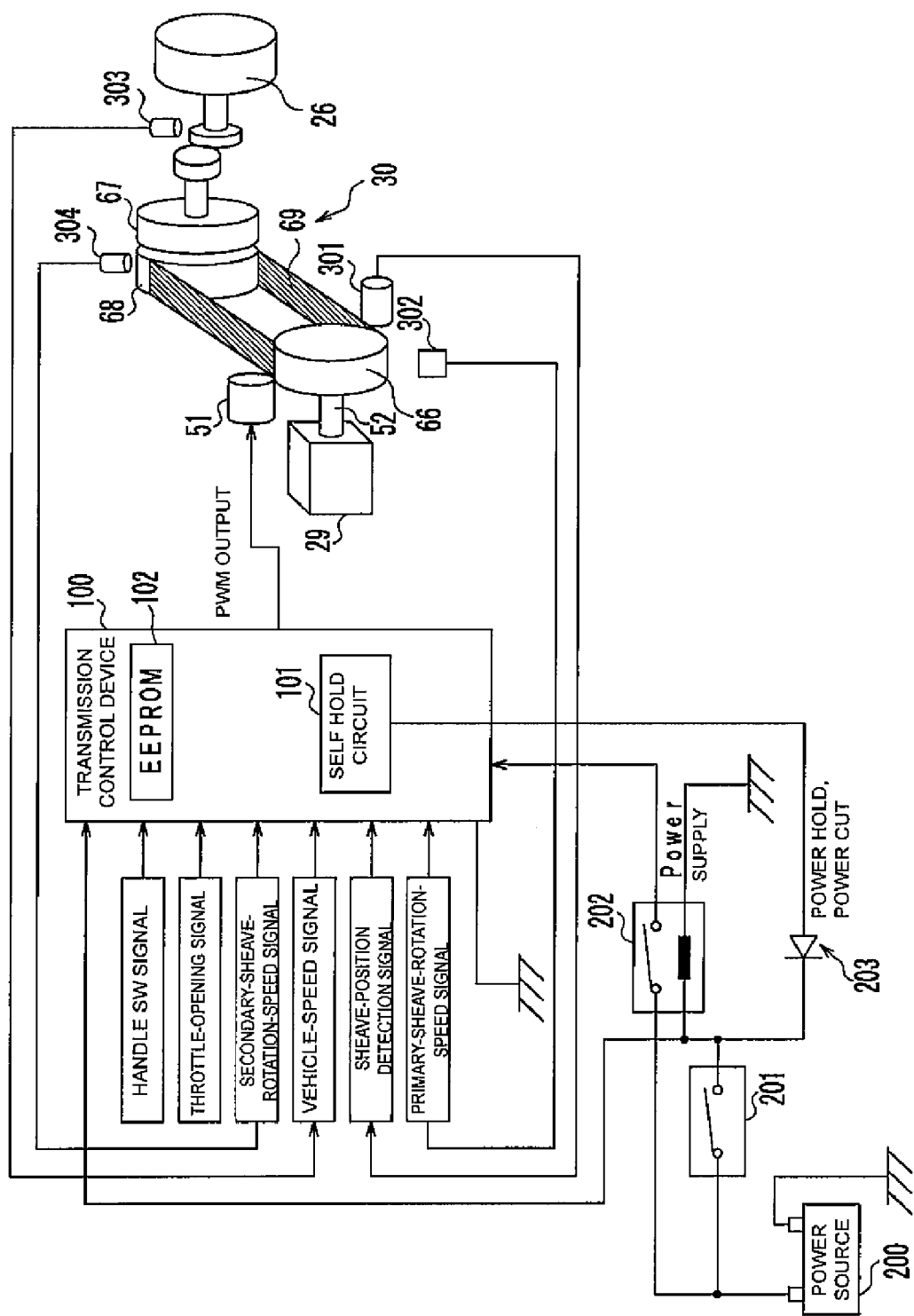

[Fig. 5]
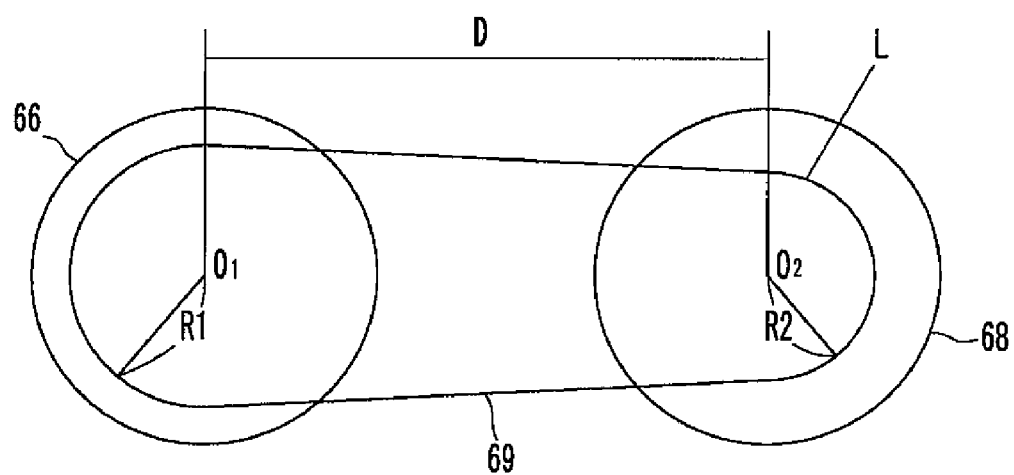

[Fig. 6]
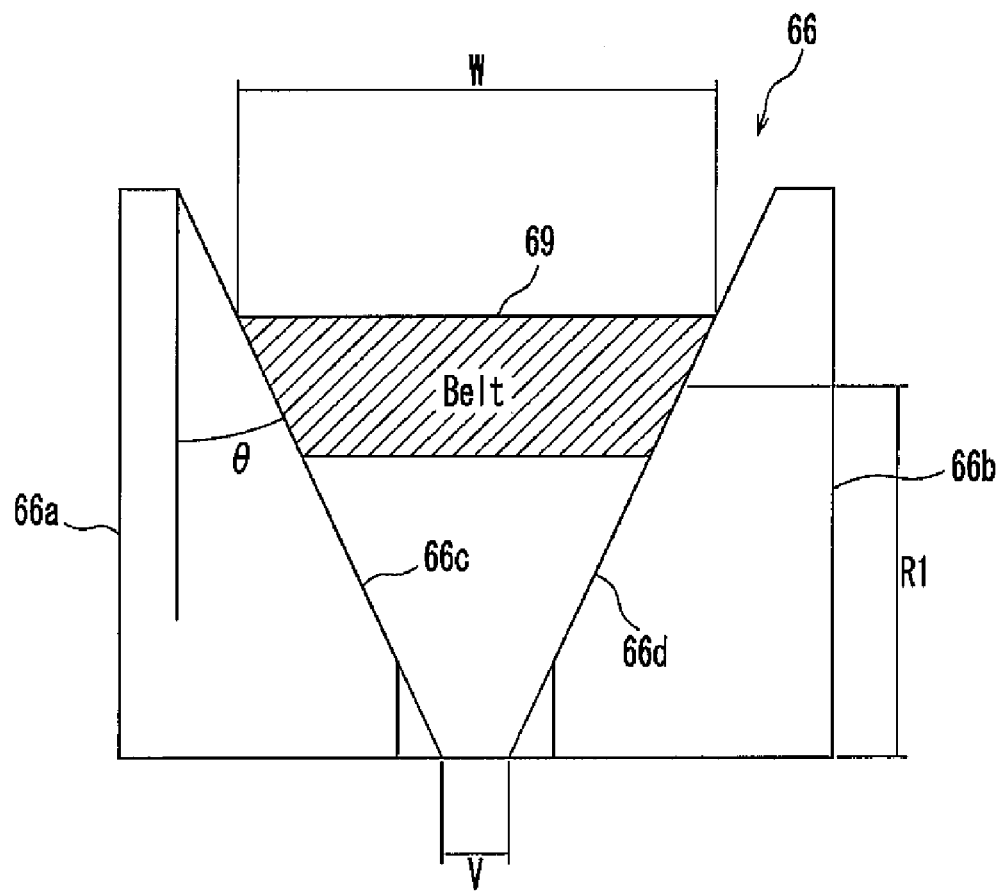

[Fig. 7]
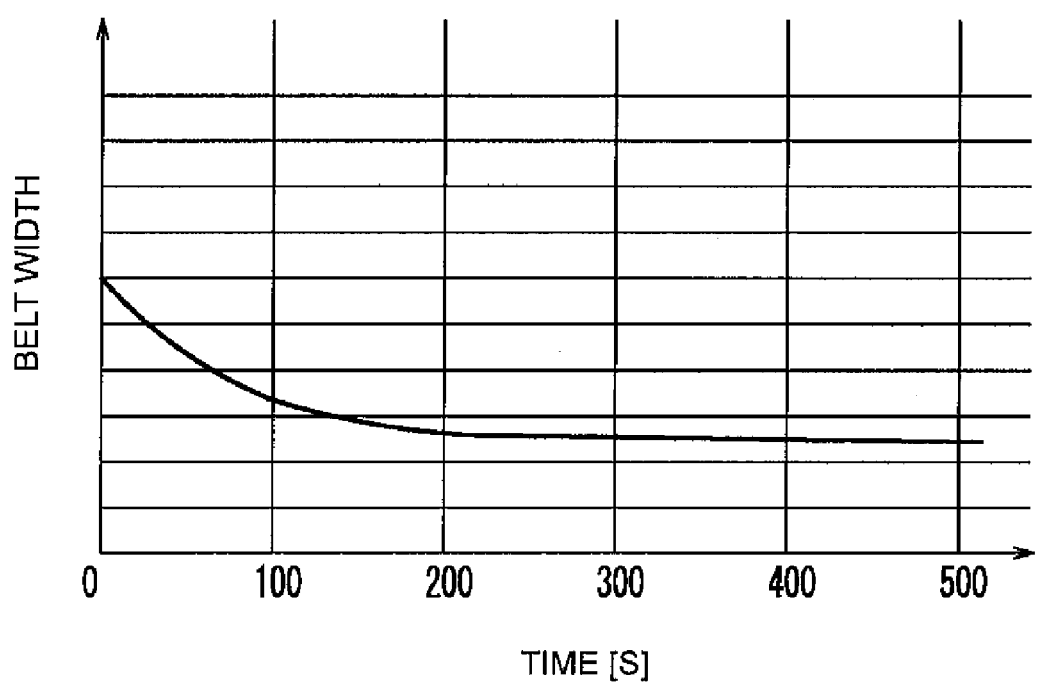

[Fig. 8]
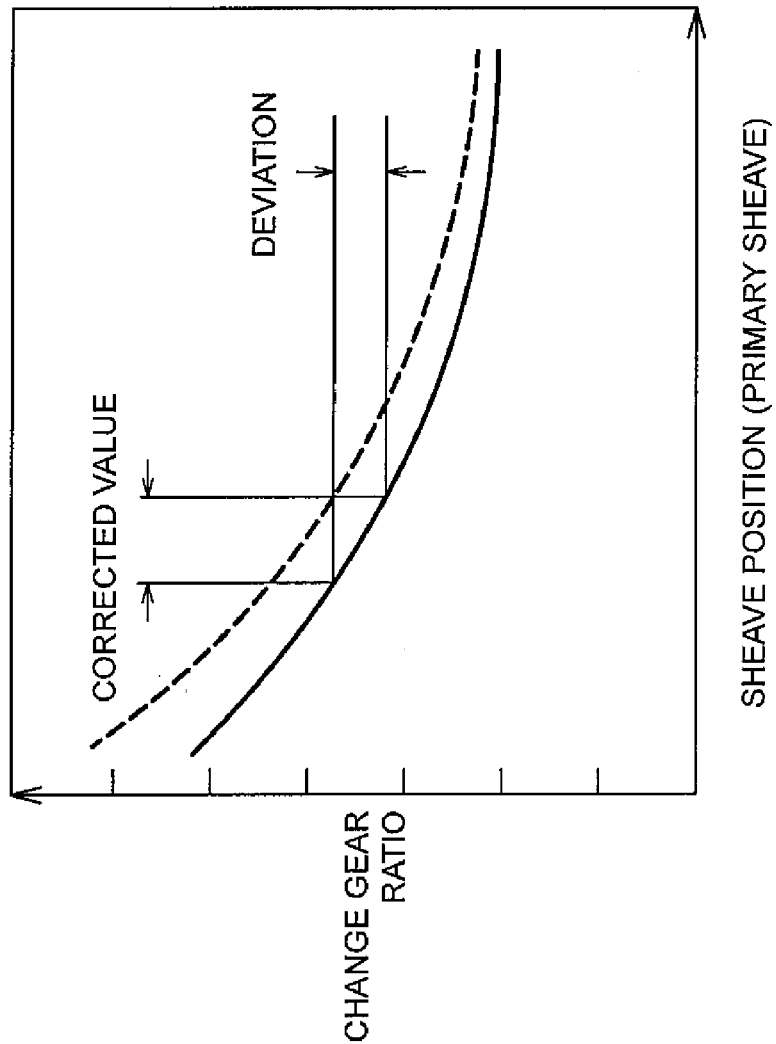

[Fig. 9]
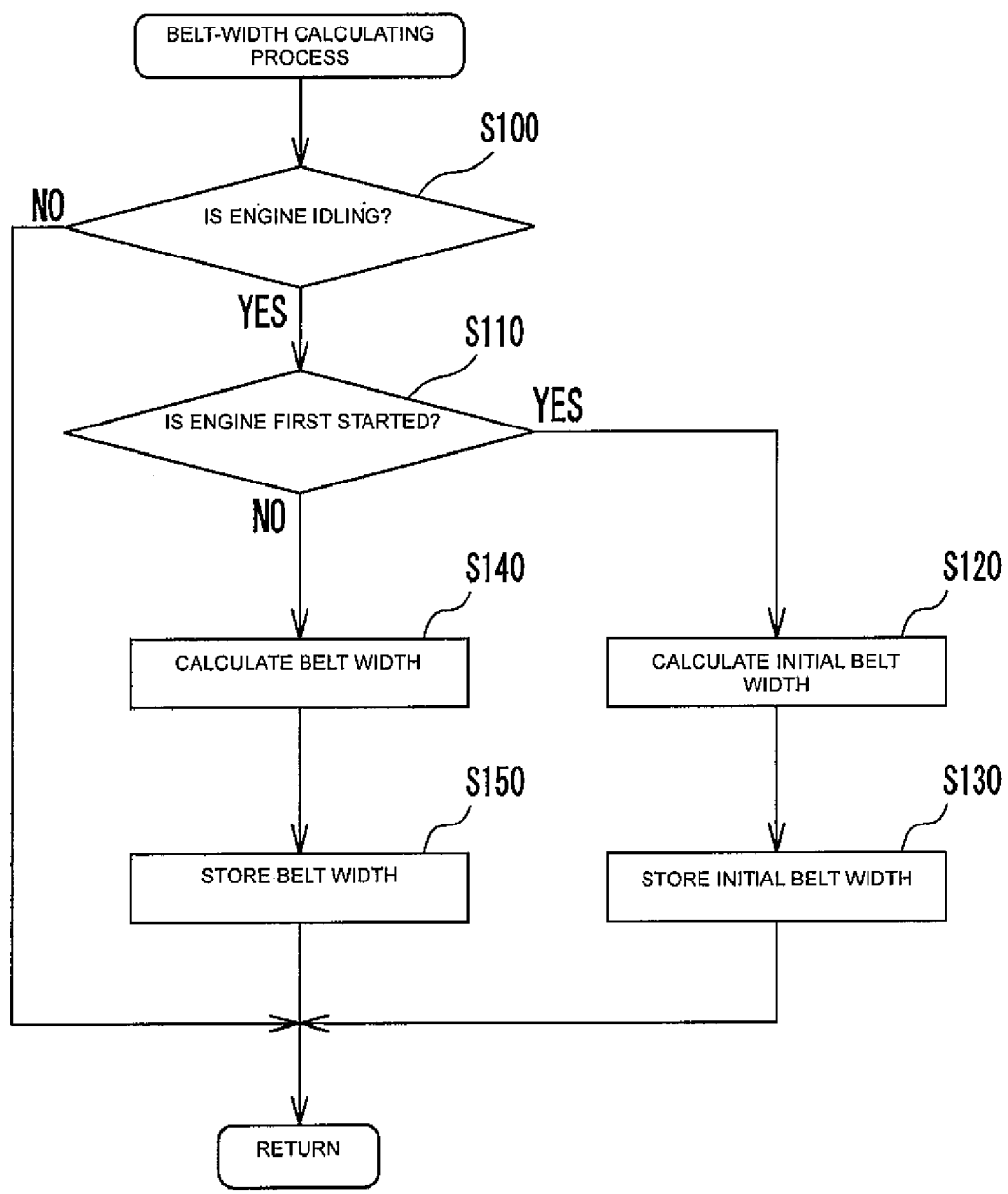

[Fig. 10]
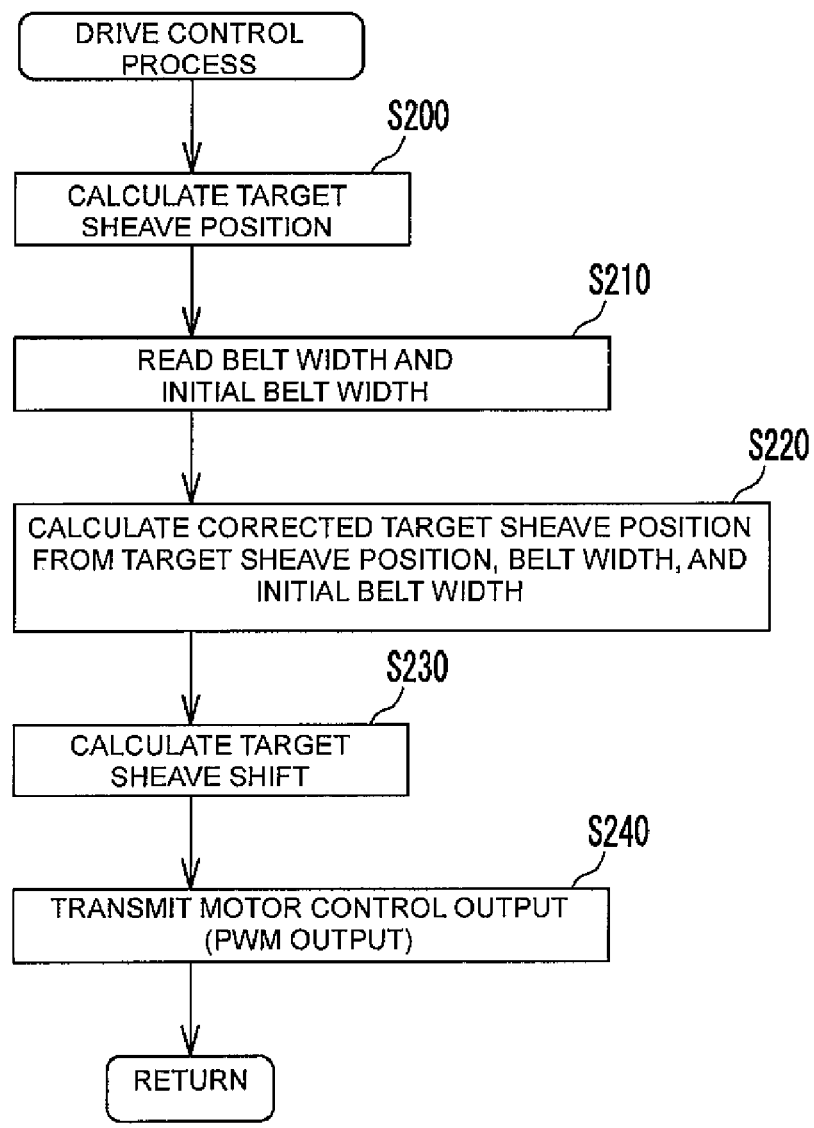

[Fig. 11]
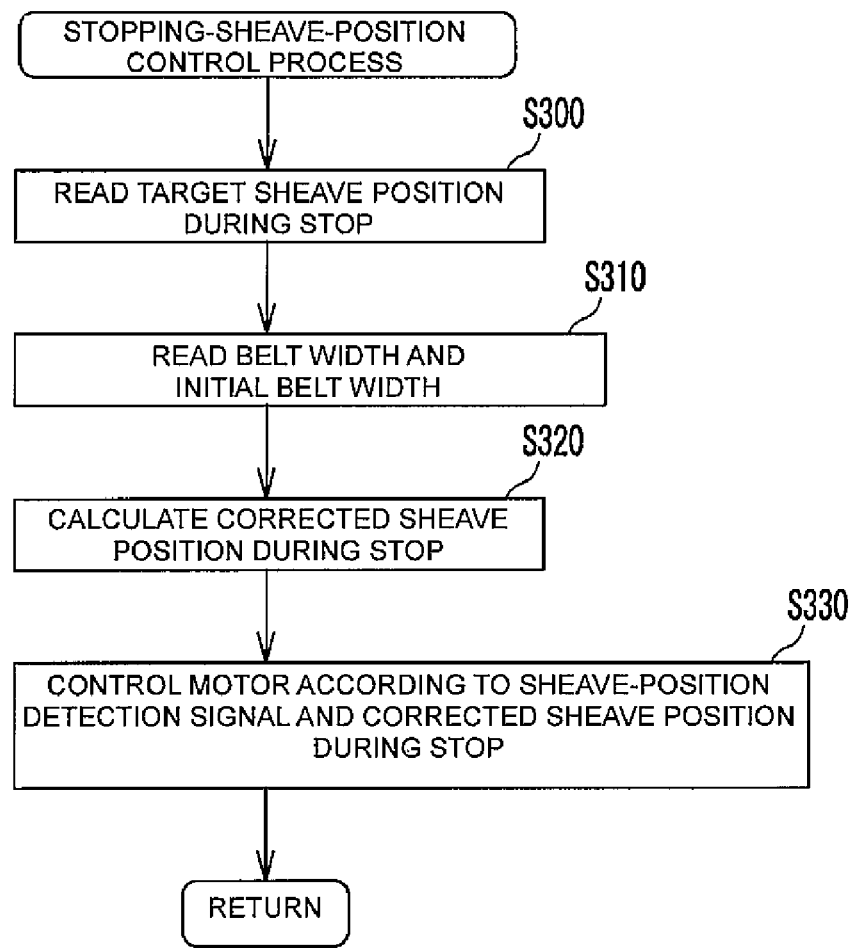

[Fig. 12]
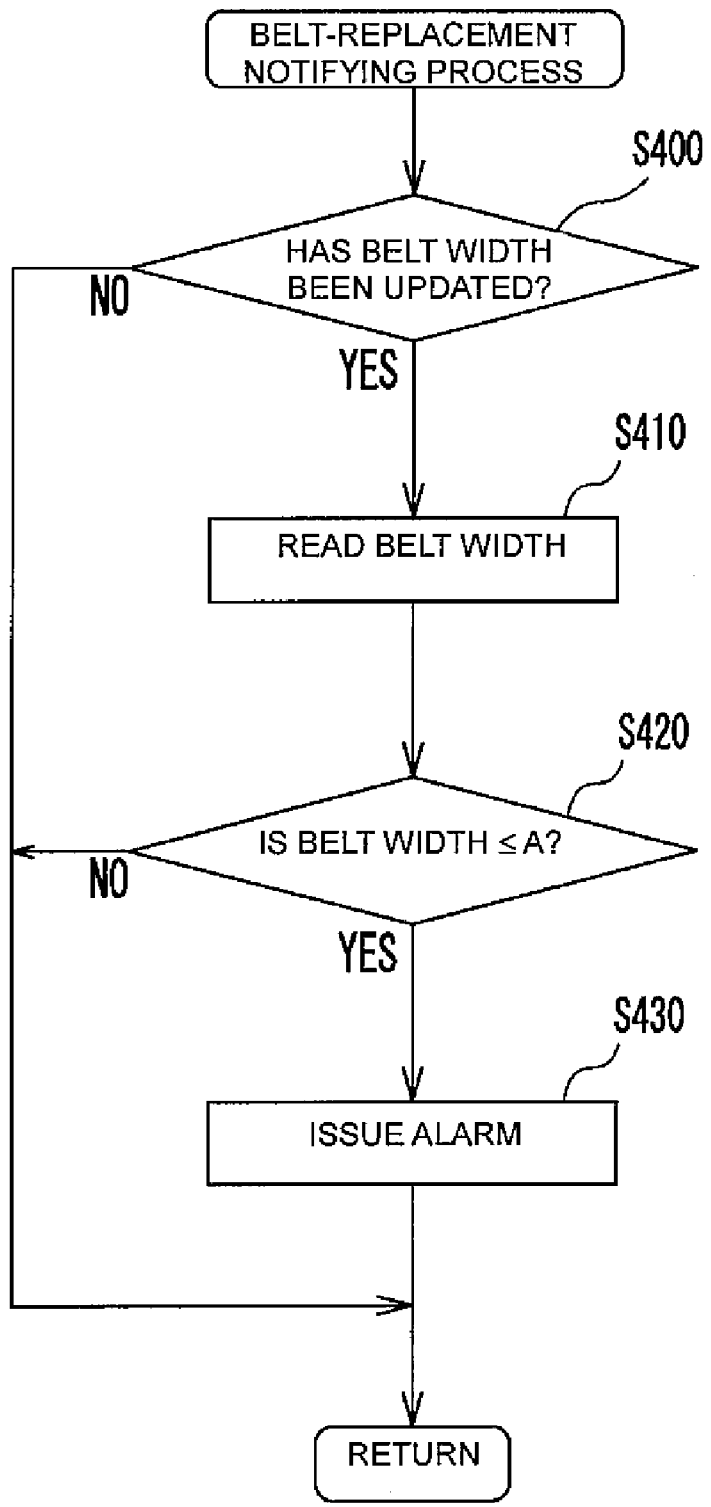

[Fig. 13]

| BELT WIDTH (mm) | BELT LIFE (YEAR) |
|---|---|
| 23 | 3 |
| 22 | 2 |
| 21 | 1 |
| 20 | 0 |

CONTINUOUSLY-VARIABLE-TRANSMISSION CONTROL DEVICE AND STRADDLE-TYPE VEHICLE

RELATED APPLICATIONS

This application claims the benefit of priority under 35 USC 119 of Japanese patent application no. 2006-007655, filed on Jan. 16, 2006, which application is hereby incorporated by reference in its entirety.

BACKGROUND OF THE INVENTION

1. Field of the Invention

The present invention relates to a continuously-variable-transmission control device including a V-belt type continuously variable transmission and an actuator for changing the change gear ratio of the V-belt type continuously variable transmission.

2. Description of Related Art

It is known in the art to provide a continuously-variable-transmission control device including a V-belt type continuously variable transmission and an actuator, wherein the change gear ratio of the V-belt type continuously variable transmission is automatically changed by the actuator. It is also known to provide a continuously-variable-transmission control device that compares a change gear ratio preset according to the throttle opening of the vehicle with a change gear ratio calculated from the measurement of the primary-sheave-rotation-speed sensor and the measurement of a secondary-sheave-rotation-speed sensor and that performs feedback control so that the deviation becomes zero (for example, refer to Japanese Patent No. 3,194,641).

The V-belt is worn down from long-time use to decrease in width. The decrease in the width causes the sheave to be displaced, so that the actual change gear ratio deviates from an intended change gear ratio. However, the continuously-variable-transmission control device described in Japanese Patent No. 3,194,641 performs feedback control based on a measured change gear ratio (actual change gear ratio). Accordingly, there is no problem even if the sheave is displaced with a decrease in the width of the belt.

However, such feedback control increases the processing load on the control device for controlling the drive of the actuator. In addition, it does not always provide sufficient control response and stability. Moreover, since the driver cannot recognize the wear of the V-belt, it is difficult to replace the V-belt at an appropriate time.

SUMMARY OF THE INVENTION

The present invention has been made in light of such circumstances, and provides a continuously-variable-transmission control device that reduces the processing load on the control unit. The invention also provides a continuously-variable-transmission control device with high control response and stability. The invention also provides a continuously-variable-transmission control device that allows recognizing of the abrasion wear of the V-belt.

A continuously-variable-transmission control device according to the invention includes: a V-belt type continuously variable transmission including first and second sheave shafts, first and second sheaves rotating with the first and second sheave shafts, and a V-belt wound around the first and second sheaves; an actuator that changes a change gear ratio of the V-belt type continuously variable transmission by changing a position of the first or second sheave; a control device that controls a drive of the actuator; a belt-width calculation unit that calculates a width of the V-belt; and a storage unit that stores the belt width calculated by the belt-width calculation unit.

The continuously-variable-transmission control device calculates the width of the V-belt and stores the calculated belt width. This enables various controls based on the actual belt width. For example, this makes it possible to correct the target position of the first or second sheave due to worn-out V-belt on the basis of the actual belt width, and to execute a feed-forward control on the sheave position on the basis of the correction result (or a feed-forward control on the change gear ratio based on the sheave position). This feed-forward control reduces the processing load on the control device and improves control response and stability.

Moreover, the belt width is displayed or an alarm that alerts the driver to change the belt width is given based on the calculated belt width. This enables replacement of the V-belt at an appropriate time.

The invention reduces a processing load on the control device of the continuously-variable-transmission control device, improves control response and stability, and enables the V-belt to be replaced at an appropriate time.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a side view of a motorcycle according to an embodiment of the invention.

FIG. 2 is a sectional view of a V-belt type continuously variable transmission of an engine unit of the motorcycle shown in FIG. 1.

FIG. 3 is a sectional view of the engine unit.

FIG. 4 is a diagram of the overall structure of a continuously variable transmission control device including the transmission control device shown in FIG. 2.

FIG. 5 is a schematic side view of a primary sheave and a secondary sheave.

FIG. 6 is a schematic sectional view of the primary sheave.

FIG. 7 is a graph of belt widths calculated by temporal statistical process.

FIG. 8 is a graph showing the relationship between a sheave position and a change gear ratio.

FIG. 9 is a flowchart of a belt-width calculating process.

FIG. 10 is a flowchart of the process of controlling the drive of a starter at startup or at gear shift during driving.

FIG. 11 is a flowchart of the process of controlling the sheave position while the motorcycle stops.

FIG. 12 is a flowchart of a belt-replacement notifying process.

FIG. 13 is a table that lists the correspondence between the width and life of the V-belt.

DETAILED DESCRIPTION OF THE INVENTION

An embodiment of the present invention is described in detail below with reference to the drawings.

As shown in FIG. 1, a straddle-type vehicle according to one embodiment of the invention is a motorcycle 10. The shape, maximum speed, displacement and size of the vehicle are not limited to that shown in FIG. 1. The straddle-type vehicle according to the invention may be another type of motorcycle such as one having a fuel tank in front of the seat, and may be another type of straddle-type vehicle such as a four-wheeled buggy.

In the following description, front, back, right, and left indicate directions from the perspective of a driver in a seat 16. As shown in FIG. 1, most of the front and both sides of motorcycle 10 are covered with a cowl. Seat 16 is between a front wheel 19 and a rear wheel 26 serving as a driving wheel, and an engine unit 28 is below the seat 16. Engine unit 28 includes an engine 29 (see FIG. 3) that is a gasoline engine. The engine 29 (see FIG. 3) is not limited to an internal combustion engine such as a gasoline engine but may be a motor engine or the like.

FIG. 2 is a sectional view of a V-belt type continuously variable transmission (hereinafter, referred to as a CVT) 30 mounted to the engine unit 28 of the motorcycle 10 shown in FIG. 1; and FIG. 3 is a sectional view of the engine unit 28. As shown in FIG. 3, the engine unit 28 includes the engine 29 which is a forced-air-cooling four-cycle engine and a transmission case 37 extending from the left of a crankcase 35 toward the rear. The crankcase 35 is divided into a left case 35a and a right case 35b. The transmission case 37 is integrated with the left case 35a. A crankshaft 52 is rotatably disposed between the left case 35a and the right case 35b.

A cylinder block 17 extending forward is connected to the front of the crankcase 35. A piston 17a in the cylinder block 17 is connected to the crankshaft 52 through a connecting rod 17b. The periphery of the cylinder block 17 and a cylinder head 40 is covered with an air shroud 42 into which outside air is blown by a fan (not shown) that rotates with the crankshaft 52.

The left sides of the transmission case 37 and the left case 35a are covered with a case cover 43. A transmission chamber 44 is formed between the transmission case 37 and the left case 35a and the case cover 43. An end of the crankshaft 52 is introduced to the front end of the transmission chamber 44. The rear of the transmission chamber 44 supports a driven shaft 57 parallel to the crankshaft 52 and the axle 59 of the rear wheel 26 (see FIG. 1). A gear transmission 60 is disposed between the driven shaft 57 and the axle 59.

A housing 45 projecting toward the transmission chamber 44 abuts the left side of the left case 35a. The space between the housing 45 and the left case 35a forms a clutch chamber 46. The clutch chamber 46 is fluid-tightly separated from the transmission chamber 44. The crankshaft 52 passes through the clutch chamber 46. The clutch chamber 46 accommodates an idler shaft 58 in parallel with the crankshaft 52.

The idler shaft 58 is rotatably supported to the left case 35a of the crankcase 35 and the housing 45 by a bearing 48. The left end of the idler shaft 58 passes through the housing 45 into the transmission chamber 44. The periphery of the led-out portion 58a integrally has a spur gear 49. The part of the idler shaft 58 passing through the clutch chamber 46 has spline teeth 58b (see FIG. 2). A boss 54 (see FIG. 2) of a starting gear 53, to be described later, is mounted next to the spline teeth 58b.

The starting gear 53 can move along the axis of the idler shaft 58 and is rotatably supported by the idler shaft 58. The starting gear 53 engages with a drive shaft 51a of a starter 51 all the time. The starter 51 is supported by the crankcase 35 and located in the upper rear of the idler shaft 58. The starter 51 corresponds to the actuator of the invention.

As shown in FIG. 2, a boss 55a of an intermediate gear 55 is press-fitted on the outer periphery of a boss 54 of the starting gear 53. An end of the inner surface of the boss 55a covers the outer periphery of the idler shaft 58. The inner surface of the boss 55a has spline grooves 55b that detachably engage with the spline teeth 58b. The starting gear 53 in which the intermediate gear 55 is press fitted is urged by a spring 56 in the direction in which the spline grooves 55b and the spline teeth 58b engage with each other (to the left in the drawing). The engagement of the spline grooves 55b and the spline teeth 58b causes the starting gear 53 and the idler shaft 58 to rotate together. Intermediate gear 55 is a helical gear.

Referring to FIG. 2, a sleeve 61 is spline-fitted around the outer circumference of the crankshaft 52 passing through the clutch chamber 46. The sleeve 61 is rotatably supported to the housing 45 by a bearing 62. A one-way clutch 70 is mounted around sleeve 61. The one-way clutch 70 allows transmission of a driving force from the starter 51 to the crankshaft 52, and is accommodated in the clutch chamber 46. The one-way clutch 70 includes an input gear 63 that always engages with the intermediate gear 55. The input gear 63 is a helical gear.

At the start of the engine 29, the starter 51 is activated to rotate. Drive shaft 51a rotates with starter 51. Starting gear 53, the intermediate gear 55, and the input gear 63 rotate in conjunction with drive shaft 51a. As described above, both the intermediate gear 55 and the input gear 63 are helical gears. The engagement of these helical gears causes thrust in the direction against the urging force of the spring 56 (to the right in the drawing). As a result, the intermediate gear 55 and the starting gear 53 move toward the right against the urging force of the spring 56 to cancel the engagement between the spline grooves 55b and the spline teeth 58b. The movement enables the starting gear 53 and the intermediate gear 55 to run idle over the idler shaft 58 without rotating with the idler shaft 58. In other words, at the start of the engine 29, the driving force of the starter 51 is transmitted only to the crankshaft 52 via the starting gear 53, the intermediate gear 55, the input gear 63, and the one-way clutch 70 accommodated in the clutch chamber 46.

The transmission chamber 44 accommodates a CVT 30 that moves the crankshaft 52 and the driven shaft 57 in conjunction. As shown in FIG. 2, the CVT 30 includes a primary sheave 66 that rotates with the crankshaft 52, a secondary sheave 68 mounted to the outer circumference of the driven shaft 57 with a centrifugal clutch 67 therebetween, and a V-belt 69 wound around the primary sheave 66 and the secondary sheave 68.

The primary sheave 66 includes a fixed sheave half 66a fixed to one end of the crankshaft 52 and a moving sheave half 66b mounted to the crankshaft 52 in such a manner as to move along the axis thereof. The opposing faces of the fixed sheave half 66a and the moving sheave half 66b form conical surfaces 66c and 66d inclined so as to increase the interval between both sheave halves radially outward from the axis, respectively. A V-cross-section belt groove 66e around which the V-belt 69 is wound is formed between the conical surfaces 66c and 66d.

The moving sheave half 66b of the primary sheave 66 has a cylindrical boss 64 through which the crankshaft 52 passes. A cylindrical slider 65 is fixed to the inside of the boss 64. A sleeve 71 is disposed between the slider 65 and the crankshaft 52. The sleeve 71 is spline-fitted on the outer circumferential surface of the crankshaft 52, and is rotated with the crankshaft 52. The slider 65 is mounted to the outer circumferential surface of the sleeve 71 in such a manner as to move along the axis thereof. The slider 65 has a guide groove 65a extending along the axis, in which a slide pin 72 projecting from the outer circumference of the sleeve 71 is axially slidably fitted. This arrangement enables the moving sheave half 66b fixed to the slider 65 to move along the axis of the crankshaft 52.

A cylindrical feed guide 73 projecting to the moving sheave half 66b is fixed to the side 45a of the housing 45 facing the moving sheave half 66b with screws. The feed guide 73 is disposed in parallel with the crankshaft 52, and has a male screw 74 on the outer circumferential surface.

The feed guide 73 has a reciprocating gear 80 on the outer circumferential surface thereof. The reciprocating gear 80 is disposed between the moving sheave half 66b of the primary sheave 66 and the one-way clutch 70, and always engages with the spur gear 49 of the idler shaft 58. The reciprocating gear 80 is therefore rotated by the driving force from the idler shaft 58. The inner circumferential surface of a boss 81 of the reciprocating gear 80 has a female screw 82 that engages with the male screw 74. The male screw 74 and the female screw 82 are trapezoidal screws having a trapezoidal cross section. One end of the boss 81 of the reciprocating gear 80 is supported to the outer circumference of the boss 64 of the moving sheave half 66b by a bearing 83.

In this embodiment, the starter 51 serves not only as the starter of the engine 29 but also as an actuator that changes the position of the moving sheave half 66b of the primary sheave 66. When the starter 51 rotates to rotate the drive shaft 51a, the starting gear 53 is rotated therewith. When the starting gear 53 rotates, the intermediate gear 55 fixed to the starting gear 53 is also rotated. Here, the rotation speed of the starter 51 when the position of the moving sheave half 66b is changed is low, so that the intermediate gear 55 and the starting gear 53 do not move to the right against the urging force of the spring 56 by the occurrence of thrust. This prevents the disengagement between the spline grooves 55b of the intermediate gear 55 and the spline teeth 58b of the idler shaft 58.

Accordingly, the driving force of the starter 51 is transmitted to the idler shaft 58 to rotate the idler shaft 58, and then transmitted from the spur gear 49 at the end of the idler shaft 58 to the reciprocating gear 80 to rotate the reciprocating gear 80.

When the reciprocating gear 80 rotates, the reciprocating gear 80 is moved axially on the outer circumferential surface of the feed guide 73 by the engagement between the male screw 74 and the female screw 82. The movement causes the moving sheave half 66b to move along the axis of the crankshaft 52. This action causes the moving sheave half 66b to change in position, thereby changing the width of the belt groove 55e. The change in the sheave position (the position of the moving sheave half 66b) is controlled by a transmission control device 100 connected to the starter 51. The one-way clutch 70 is not brought into engagement but is held disconnected according to the rotation speed of the starter 51 when the position of the moving sheave half 66b is changed.

The secondary sheave 68 includes a fixed sheave half 68a fixed to the driven shaft 57 and a moving sheave half 68b mounted to the driven shaft 57 in such a manner as to move along the axis thereof. The opposing faces of the fixed sheave half 68a and the moving sheave half 68b form conical surfaces 68c and 68d inclined so as to increase the interval between both sheave halves radially outward from the axis, respectively. A V-cross-section belt groove 68e around which the V-belt 69 is wound is formed between the conical surfaces 68c and 68d.

The fixed sheave half 68a has a cylindrical guide 76. The guide 76 is rotatably supported to the outer circumferential surface of the driven shaft 57 by a bearing 75. A centrifugal clutch 67 is disposed between the fixed sheave half 68a and the driven shaft 57. The centrifugal clutch 67 includes a centrifugal plate 77 that rotates with the guide 76 of the fixed sheave half 68a, a centrifugal weight 78 supported by the centrifugal plate 77, and a clutch housing 79 fixed to one end of the driven shaft 57.

When the rotation speed of the centrifugal plate 77 that rotates integrally with the fixed sheave half 68a reaches a predetermined value, the centrifugal weight 78 is moved radially outwards by centrifugal force into contact with the clutch housing 79 to transmit the rotation of the fixed sheave half 68a to the driven shaft 57.

The moving sheave half 68b has a cylindrical boss 84 that is supported around the outer circumferential surface of the guide 76 in such a manner as to move along the axis thereof. The moving sheave half 68b is urged in the direction to decrease the width of the belt groove 68e (toward the right in the drawing) by a spring 86. Accordingly, when the moving sheave half 66b of the primary sheave 66 is driven by the starter 51 to decrease the width of the belt groove 66e, the V-belt 69 on the secondary sheave 68 side is drawn radially inward. The moving sheave half 68b of the secondary sheave 68 is moved in the direction to increase the width of the belt groove 68e (toward the left in the drawing) against the urging force of the spring 86. At that time, the change gear ratio of the CVT 30 is decreased.

FIG. 4 is a diagram of the overall structure of a continuously variable transmission control device including the transmission control device 100 of FIG. 2. The continuously variable transmission control device of FIG. 4 includes the transmission control device 100 (see also FIG. 2) having a self hold circuit 101, a main switch 201, a main relay 202, a power-source hold/cut circuit 203, a power source 200, a sheave-position detection unit 301, a primary-sheave rotation speed meter 302, a vehicle speed meter 303, and a secondary-sheave rotation speed meter 304. The continuously variable transmission control device of FIG. 4 further includes the CVT 30 having the primary sheave 66, the secondary sheave 68, and the V-belt 69, and the starter 51 for changing the change gear ratio of the CVT 30.

The power source 200 supplies supply voltage to the transmission control device 100 via the main switch 201 and the main relay 202, and supplies hold voltage to the self hold circuit 101 in the transmission control device 100 via the power-source hold/cut circuit 203.

The main switch 201 is a switch that a driver operates when starting the motorcycle. When the main switch 201 is turned on by the switching operation of the driver, supply voltage is supplied from the power source 200 to the power-source hold/cut circuit 203. The main switch 201 also outputs a main SW signal indicative of ON or OFF to the transmission control device 100.

The main relay 202 includes an exciting coil and a contact. When supply voltage is applied to the exciting coil via the main switch 201, the main relay 202 turns the contact on to supply the supply voltage to the transmission control device 100.

The power-source hold/cut circuit 203 includes a constant-voltage diode. When the supply voltage supplied via the main switch 201 is higher than a specified voltage, the power-source hold/cut circuit 203 supplies a hold voltage to the self hold circuit 101 in the transmission control device 100; when the supply voltage is lower than a specified voltage, the power-source hold/cut circuit 203 stops the supply of the hold voltage to the self hold circuit 101.

The sheave-position detection unit 301 is a potentiometer, and detects the position of the primary sheave 66 (the position of the moving sheave half 66b) and outputs a sheave-position detection signal to the transmission control device 100. The primary-sheave rotation speed meter 302 measures the rotation speed of the primary sheave 66 and outputs a primary-sheave-rotation-speed signal to the transmission control device 100. The vehicle speed meter 303 measures the rotation speed of the rear wheel 26 and outputs a vehicle speed signal based on the rotation speed to the transmission control device 100. The secondary-sheave rotation speed meter 304 measures the rotation speed of the secondary sheave 68 and outputs a secondary-sheave-rotation-speed signal to the transmission control device 100.

When a handle switch (not shown) mounted in a prescribed position of a handle 41 (see FIG. 1) is operated by the driver, a handle SW signal output from the handle switch is input to the transmission control device 100. Furthermore, a throttle opening signal output from a throttle-opening meter (not shown) that measures the throttle opening of a throttle valve (not shown) provided in the intake passage of the engine 29 is input to the transmission control device 100.

The transmission control device 100 controls the drive of the starter 51 according to the various input signals. Moreover, the transmission control device 100 calculates the width of the V-belt 69 on the basis of the input secondary-sheave-rotation-speed signal, sheave-position detection signal, and primary-sheave-rotation-speed signal and information on the V-belt 69 stored in a ROM (not shown). The method for calculating the belt width is specifically described later. The transmission control device 100 further includes an EEPROM 102, in which it stores the calculated width of the V-belt 69. The transmission control device 100 corresponds to the control device of the invention. The transmission control device 100 also corresponds to the belt-width calculation unit of the invention. The EEPROM 102 of the transmission control device 100 corresponds to the storage unit of the invention.

The transmission control device 100 includes the self hold circuit 101. The self hold circuit 101 includes a nonvolatile memory or the like, in which various data is stored with the hold voltage supplied from the power-source hold/cut circuit 203. When the hold voltage supplied from the power-source hold/cut circuit 203 is stopped, the self hold circuit 101 holds the various data by its self hold function.

As described above, the transmission control device 100 calculates the width of the V-belt 60. The method for calculating the belt width by the transmission control device 100 is described hereinafter.

The total length L of the V-belt 69 is expressed as Eq. (1)

$$L = 2 \cdot D + \frac{(R_1 - R_2)^2}{D} + \pi(R_1 + R_2) \quad \text{Eq. (1)}$$

where D is the distance between the sheaves, $R_1$ is the winding radius of the primary sheave 66, and $R_2$ is the winding radius of the secondary sheave 68.

As shown in FIG. 5, the total belt length L is the total length of the V-belt 69. The intersheave distance D is the distance from the axial center $O_1$ of the primary sheave 66 to the axial center $O_2$ of the secondary sheave 68. The winding radius $R_1$ of the primary sheave 66 is the distance from the axial center $O_1$ of the primary sheave 66 to the V-belt 69. The winding radius $R_2$ of the secondary sheave 68 is the distance from the axial center $O_2$ of the secondary sheave 68 to the V-belt 69.

The change gear ratio M of the CVT 30 is expressed as Eq. (2) using the winding radius $R_1$ of the primary sheave 66 and the winding radius $R_2$ of the secondary sheave 68.

$$M = \frac{R_2}{R_1} \quad \text{Eq. (2)}$$

The winding radius $R_1$ of the primary sheave 66 is expressed as Eq. (3)

$$R_1 = \frac{W + V}{2 \cdot \tan\theta} \quad \text{Eq. (3)}$$

where W is the belt width, θ is the angle of the primary sheave 66, and V is the position of the primary sheave 66.

As shown in FIG. 6, the belt width W is the width of the V-belt 69. The angle θ of the primary sheave 66 is the angle of the conical surface 66c of the fixed sheave half 66a of the primary sheave 66. The sheave position V is the position of the moving sheave half 66b, and is defined as the distance between the center line connecting the axial center of the fixed sheave half 66a and the axial center of the moving sheave half 66b and the intersections of the conical surfaces 68c and 68d. The sheave position V is calculated on the basis of the sheave-position detection signal from the sheave-position detection unit (see FIG. 4).

Eq. (4) for finding the change gear ratio M of the CVT 30 is obtained from Eq. (1) to Eq. (3).

$$\begin{cases} M = 1 + \frac{1}{2 \cdot R_1} \cdot \left[ -D \cdot \pi + \{D^2 \cdot (\pi^2 - 8) + 4 \cdot D \cdot (L - 2 \cdot \pi \cdot R_1)\}^{\frac{1}{2}} \right] \\ R_1 = \frac{W + V}{2 \cdot \tan\theta} \end{cases} \quad \text{Eq. (4)}$$

On the other hand, an actual change gear ratio $G_{IN}$ is calculated by Eq. (5)

$$G_{IN} = n_1/n_2 \quad \text{Eq. (5)}$$

where $n_1$ is the rotation speed of the primary sheave 66, which is obtained by the primary-sheave rotation speed meter 302 (see FIG. 4), $n_2$ is the rotation speed of the secondary sheave 68, which is obtained by the secondary-sheave rotation speed meter 304.

A change $\Delta W_t$ in belt width is calculated by Eq. (6) using the actual change gear ratio $G_{IN}$ and the sheave position $P_{IN}$ obtained from the detection by the sheave-position detection device $$\Delta W_t = M^{-1}(G_{IN}) - P_{IN} \quad \text{Eq. (6)}$$

where the change $\Delta W_t$ in belt width is a negative number.

The change $\Delta W_t$ in belt width calculated by Eq. (6) is calculated and stored at regular intervals, and a belt width W is calculated by Eq. (7) by temporal statistical process on the changes in belt width $\Delta W_{t-1}$, $\Delta W_{t-2}$ to $\Delta W_{t-N}$ of the past N times.

$$\Delta W = W_0 + \frac{\Delta W_{t-1} + \Delta W_{t-2} + \ldots + \Delta W_{t-N}}{N} - \Delta W_{INITIAL} \quad \text{Eq. (7)}$$

where $\Delta W_0$ is the initial value of the width of the belt unused, and $\Delta W_{INITIAL}$ is a change from the initial belt width $W_0$ calculated by the operation shown in FIG. 9, to be described later.

FIG. 7 is a graph of the belt width W calculated by temporal statistical process using Eq. (7). As shown in FIG. 7, the value of the belt width W calculated becomes constant with the passage of time. When the change gear ratio changes as during idling, such temporal statistical process enables an accurate belt width to be calculated.

The width of the V-belt 69 gradually decreases with time to cause changes in the relationship between the position of the primary sheave 66 and the change gear ratio. FIG. 8 shows a graph of the relationship between the sheave position and change gear ratio. In FIG. 8, the horizontal axis indicates the position of the primary sheave 66, in which the distance between the fixed sheave half 66a and the moving sheave half 66b increases toward the right. The vertical axis indicates the change gear ratio of the CVT 30, which increases toward the above.

The solid line in the graph indicates the target change gear ratio of the CVT 30 relative to the sheave position when the V-belt 69 is unused and the CVT 30 has no assembly error. The broken line in the graph indicates the relationship between the sheave position and change gear ratio when the belt width decreases with time. As shown in FIG. 8, when the width of the V-belt 69 decreases with time, the change gear ratio relative to the sheave position becomes larger than before (to "low"). In this embodiment, therefore, the deviation as shown in FIG. 8 is corrected by correcting the target position of the sheave when the starter 51 is controlled by the transmission control device 100.

FIG. 9 is a flowchart of a belt-width calculating process. When the belt-width calculating process is started, in step S100, the transmission control device 100 determines whether the engine is idling or not. The determination of whether the engine is idling or not is based on the measurement of the primary-sheave rotation speed meter 302. The rotation speed of the primary sheave 66 measured by the primary-sheave rotation speed meter 302 is equal to the engine speed. Thus, when the rotation speed of the primary sheave 66 is equal to or lower than a specified value, it is determined that the engine is idling. When it is determined in step S100 that the engine is not idling, the belt-width calculating process is terminated. That is, when the engine is not idling, the calculation of the width of the V-belt 69 is not performed.

On the other hand, in step S100, the transmission control device 100 determines that the engine is idling, the procedure moves to step S110 wherein it is determined whether the engine is first started. Specifically, it is determined whether the engine is first started after factory shipment or whether the engine is started in a state in which the motorcycle 10 is relatively new. This determination is made by determining whether the EEPROM 102 of the transmission control device stores the initial belt width, to be described later. When it is determined that the initial belt width is stored, the transmission control device 100 determines that the engine is not first started; when it is determined that the initial belt width is stored, the transmission control device 100 determines that the engine is first started.

In step S110, when it is determined that the engine is first started, the procedure moves to step S120 wherein the width of the V-belt 69 is calculated as the initial belt width, and the initial belt width is stored in step S130. In other words, the width of the V-belt 69 is calculated by the method of calculating a belt width described above, and the belt width is stored in the EEPROM 102 as the initial belt width. Upon completion of the process of step S130, the belt-width calculation process is terminated.

On the other hand, when it is determined in step S110 that the engine is not first started, the procedure moves to steps S140 wherein the width of the V-belt 69 is calculated, and the belt width is stored in the EEPROM 102 in step S150. In step S150, the belt width calculated in step S140 is stored separately from the initial belt width. Upon completion of the process of step S150, the belt-width calculation process is terminated.

In this embodiment, as has been described with reference to FIG. 9, the width of the V-belt 69 is calculated and stored during idling. At the first startup of the motorcycle 10, the calculated belt width is stored as the initial belt width separately from belt widths calculated thereafter. The initial belt width and the belt width are used for correcting the target sheave position, to be described later.

FIG. 10 is a flowchart of the process of controlling the drive of the starter 51 at startup or at gear shift during driving. Upon starting the drive control process, the transmission control device 100 first calculates a target sheave position in step S200. In this process, the transmission control device 100 calculates the target position (target sheave position) of the moving sheave half 66b of the primary sheave 66 with vehicle speed and throttle opening as parameters. The ROM or the like of the transmission control device 100 stores a transmission map that specifies the relationship between vehicle speed and throttle opening, and target sheave position. The target sheave position may be calculated from the transmission map.

After step S200, the belt width and the initial belt width are read in step S210. That is, the initial belt width and the belt width stored in the processes of step S130 and S150 of the flowchart as shown in FIG. 9 are read from the EEPROM 102.

After step S210, a corrected target sheave position is calculated in step S220. In this process, the transmission control device 100 calculates a corrected target sheave position from the target sheave position calculated in step S200 and the belt width and the initial belt width read in step S210. Controlling the drive of the starter 51 based on the corrected target sheave position enables correction of changes in change gear ratio due to an assembly error or the wear of the V-belt 69.

After step S220, a target sheave shift is calculated in step S230. In this process, the transmission control device 100 calculates a target sheave shift from the sheave position calculated on the basis of the sheave position signal input from the sheave-position detection device 301 and the corrected target sheave position calculated by the process of step S220.

After step S230, a control output (PWM output) to the starter 51 is output according to the target sheave shift calculated in step S240, and thereafter the drive control process is terminated.

As described with reference to FIG. 10, the transmission control device 100 performs feed-forward control in which it corrects a target sheave position on the basis of the belt width and the initial belt width stored in the EEPROM 102 to obtain a corrected target sheave position, and controls the drive of the starter 51 on the basis of the corrected target sheave position. This improves control response and stability of the change gear ratio.

The transmission control device 100 controls the position of the primary sheave 66 on the basis of the belt width and the initial belt width stored in the EEPROM 102 when the motorcycle 10 stops to thereby maintain the change gear ratio constant during a stop. The control of the sheave position during a stop will be described hereinbelow.

FIG. 11 is a flowchart of the process of controlling the sheave position while the motorcycle 10 stops. When the stopping-sheave-position control process is started, the transmission control device 100 first reads a target sheave position during a stop in step S300. The target sheave position during a stop is stored in the ROM or the like of the transmission control device 100.

After step S300, the belt width and the initial belt width are read in step S310. That is, the initial belt width and the belt width stored by the processes of steps S130 and S150 of the flowchart shown in FIG. 9 are read from the EEPROM 102.

After step S310, the process of calculating a corrected target sheave position during a stop is performed. In this process, the transmission control device 100 calculates a corrected target sheave position during a stop from the target sheave position during a stop which is read in step S300 and the belt width and the initial belt width read in step S310. Setting the position of the primary sheave 66 to the corrected target sheave position during a stop enables the change gear ratio during a stop to be maintained at the target value.

After step S320, the drive of the starter 51 is controlled on the basis of the sheave-position detection signal and the corrected target sheave position during a stop. In this process, the transmission control device 100 calculates the actual position of the primary sheave 66 from the sheave-position detection signal output from the sheave-position detection unit 301, and controls the drive of the starter 51 on the basis of the actual sheave position and the corrected target sheave position calculated in step S320. Specifically, when the actual sheave position is off the corrected target sheave position, the starter 51 is driven so that the actual sheave position agrees with the corrected target sheave position. After step S330, the stopping-sheave-position control process is terminated.

As has been described with reference to FIG. 11, the transmission control device 100 performs feed-forward control on the sheave position in which it calculates a target sheave position during a stop from the belt width and the initial belt width calculated, and controls the sheave position so that the actual sheave position based on the detection result of the sheave-position detection unit 301 (see FIG. 4) agrees with the target sheave position. Since the change gear ratio during a stop tends to change, it is difficult to designate a sheave position on the basis of the measurement of the change gear ratio. However, the target sheave position is calculated from the belt width and the initial belt width, and the drive of the starter 51 is controlled so that the actual sheave position agrees with the target sheave position, thus enabling a stable stopping change gear ratio to be provided.

Furthermore, the time when the width of the V-belt 69 calculated by the belt-width calculation process shown in FIG. 9 becomes equal to or smaller than a specified value is determined to be the time to replace the V-belt 69, and the driver is notified of it.

FIG. 12 is a flowchart of a belt-replacement notifying process. When the belt-replacement notifying process is started, the transmission control device 100 first determines in step S400 whether the belt width has been updated. In this process, the transmission control device 100 determines whether the belt width is newly stored (updated) in the EEPROM 102 in step S150 of the flowchart shown in FIG. 9. When it is determined that the belt width has not been updated, the belt-replacement notifying process is terminated.

On the other hand, when it is determined in step S400 that the belt width has been updated, the belt width is read in step S410. That is, the belt width updated in the EEPROM 102 is read. After step S410, it is determined in step S420 whether the belt width has become equal to or smaller than a threshold A. That is, the transmission control device 100 compares the belt width read in step S410 with the stored threshold A to determined whether the belt width is equal to or smaller than the threshold A.

When it is determined in step S420 that the belt width has not become equal to or smaller than the threshold A (larger than the threshold A), the belt-replacement notifying process is terminated. On the other hand, when it is determined that the belt width has become equal to or smaller than the threshold A, an alarm is given in step S430. Motorcycle 10 has an indicator (not shown) that alerts the driver to replace the belt, and issues an alarm by lighting the indicator. The indicator corresponds to the display of the invention.

As has been described, the motorcycle 10 calculates the width W of the V-belt 69 from the position V of the primary sheave 66, the length L of the V-belt 69, the intersheave distance D, the angle $\theta$ of the sheave, and the change gear ratio M, and stores the calculated belt width. The motorcycle 10 thus performs feed-forward control on the starter 51 in such a manner as to correct the target position of the primary sheave 66 on the basis of the belt width and control the sheave position so as to reach the corrected target sheave position. This arrangement reduces a processing load on the transmission control device 100, and improves control response and stability.

In particular, since response speed is important for motorcycles, application of the invention to motorcycles gives great satisfaction to drivers who have considerable experience in driving.

The arrangement for the feed-forward control on the sheave position based on the calculated width of the V-belt has the following advantages in comparison with a feed-back control in which an actual change gear ratio and a target change gear ratio are compared. That is, the feed-back controls need to always monitor the rotation speed of the primary sheave 66 and the rotation speed of the secondary sheave 68 during driving by the primary-sheave rotation speed meter 302 and the secondary-sheave rotation speed meter 304. However, since the present invention performs feed-forward control based on the stored belt width, there is no need to monitor the rotation speeds by the primary-sheave rotation speed meter 302 and the secondary-sheave rotation speed meter 304. On the other hand, since the engine speed is necessary for calculating the target sheave position, the primary-sheave rotation speed meter 302 needs to be operated during driving. Thus, the invention has the advantage that the sheave position can be controlled even if the secondary-sheave rotation speed meter 304 comes out of operation because of a malfunction or the like during driving.

In the motorcycle 10 according to the invention, when the width of the V-belt 69 has become equal to or smaller than the threshold A, an alarm that alerts the driver to replace the V-belt 69 is given by the lighting of the indicator. This enables the driver to replace the V-belt 69 at an appropriate time.

The motorcycle 10 according to the invention is constructed such that the width of the belt when the motorcycle 10 is first started is stored in the EEPROM 102 as the initial belt width, and the position of the primary sheave 66 is corrected on the basis of the initial belt width and the belt width stored in the EEPROM 102. This arrangement enables the sheave position to be corrected so that the change gear ratio agrees with the target value even if the change gear ratio relative to the sheave position is off the target value with the motorcycle 10 in new condition because of the assembly error of the CVT 30 or the like.

The motorcycle 10 according to the embodiment performs feed-forward control on the sheave position in which it calculates a target sheave position during a stop from the belt width and the initial belt width calculated, and controls the sheave position so that the actual sheave position based on the detection result of the sheave-position detection unit 301 agrees with the target sheave position. Since the change gear ratio during a stop tends to change, it is difficult to designate a sheave position on the basis of the measurement of the change gear ratio. However, the present invention enables a stable stopping change gear ratio to be achieved.

The motorcycle 10 according to the invention is constructed such that the calculation of the belt width and the initial belt width is performed during idling. Since a load on the V-belt 69 is small during idling, the accuracy of the belt width calculated is increased.

The motorcycle 10 according to the invention is constructed such that when the width of the V-belt 69 has become equal to or smaller than the threshold A, an alarm that alerts the driver to replace the V-belt 69 is given by the lighting of the indicator. However, the method for alerting the driver to replace the V-belt 69 is not so limited and the following structure may be adopted.

For example, the belt width calculated in step S140 of FIG. 9 and stored in the EEPROM 102 in step S150 may be displayed at it is. In this case, the motorcycle 10 is equipped with a display such as a liquid-crystal display, on which the calculated belt width is displayed.

A table that lists the correspondence between the width and life of the belt as shown in FIG. 13 may be stored in the ROM or the like of the transmission control device 100, from which the driver is notified of a belt life corresponding to a belt width calculated. FIG. 13 is a table that lists the correspondence between the width and life (remaining period until the time the V-belt 69 is to be replaced) of the V-belt 69. This allows the driver to estimate a decrease in the width of a V-belt, e.g., about 1 mm every year. The table of FIG. 13 presents the period until the width of the belt comes to a belt width to be replaced (in FIG. 13, 20 mm) calculated from the estimated value and the calculated belt width).

While a case in which the motorcycle 10 performs a feed-forward control on the position of the primary sheave 66 on the basis of the calculated belt width has been described, the invention is not limited to the feed-forward control. The invention may also adopt both the feed-forward control and the feedback control based on the comparison of a measured actual change gear ratio and a target change gear ratio. Alternatively, the invention may normally adopt feedback control and, when the secondary-sheave rotation speed meter 304 necessary for feedback control fails, may switch to a feed-forward control for an emergency.

While a the case in which the position of the primary sheave 66 is changed by the starter 51 for starting the engine 29 has been described, the invention may have an actuator (a motor or the like) for changing the sheave position, separately from the starter for starting the engine.

While the straddle-type vehicle of has been described as a motorcycle 10, the invention is not limited to a motorcycle but may be a four-wheeled buggy or the like.

As described above, the invention is useful for a continuously-variable-transmission control device.

The particular embodiments of the invention described in this document should be considered illustrative, rather than restrictive. Modification to the described embodiments may be made without departing from the spirit of the invention as defined by the following claims.

The invention claimed is:

1. A continuously-variable-transmission control device comprising:

a V-belt continuously variable transmission including first and second sheave shafts, first and second sheaves rotating with the first and second sheave shafts, and a V-belt wound around the first and second sheaves;

an actuator that changes a change gear ratio of the V-belt continuously variable transmission by changing a position of the first or second sheave;

a control device that controls a drive of the actuator;

a belt-width calculation unit that calculates a width of the V-belt during idling;

a storage unit that stores the calculated belt width;

a correction unit that corrects a driving state of the actuator controlled by the control device, on the basis of the belt width stored in the storage unit, wherein;

the actuator changes the position of the first or second sheave to a target position;

the correction unit corrects the target position of the actuator; and the control device controls the drive of the actuator so that the first or second sheave reaches the corrected target position.

2. The continuously-variable-transmission control device according to claim 1, wherein the belt-width calculation unit calculates the width of the V-belt during a first startup as an initial belt width;

the storage unit stores the initial belt width; and the correction unit corrects the driving state of the actuator controlled by the control device, on the basis of the belt width and the initial belt width stored in the storage unit.

3. The continuously-variable-transmission control device according to claim 1, wherein the control device performs a feed-forward control on the position of the first or second sheave.

4. The continuously-variable-transmission control device according to claim 1, further comprising a sheave-position setting unit that sets the position of the first or second sheave during a stop on the basis of the belt width stored in the storage unit.

5. The continuously-variable-transmission control device according to claim 1, wherein the belt-width calculation unit calculates the width of the V-belt on the basis of the position of the first or second sheave, a length of the V-belt, a distance between the first and second sheaves, an angle of the sheave, and the change gear ratio.

6. The continuously-variable-transmission control device according to claim 5, further comprising:

a sheave-position detection unit that detects the position of the first or second sheave; and first- and second-sheave rotation speed meters that measure rotation speeds of the first and second sheaves, respectively, wherein the change gear ratio is calculated from the measurements of the first- and second-sheave rotation speed meters.

7. The continuously-variable-transmission control device according to claim 1, further comprising a display that displays information on the belt width calculated by the belt-width calculation unit.

8. The continuously-variable-transmission control device according to claim 7, wherein the display issues an alarm when the belt width calculated by the belt-width calculation unit becomes equal to or smaller than a predetermined value.

9. The continuously-variable-transmission control device according to claim 7, wherein the display numerically presents the belt width calculated by the belt-width calculation unit.

10. The continuously-variable-transmission control device according to claim 7, wherein the display presents the life of the V-belt calculated on the basis of the belt width calculated by the belt-width calculation unit.

11. The continuously-variable-transmission control device according to claim 1, wherein the actuator is a motor.

12. A straddle vehicle comprising the continuously-variable-transmission control device according to claim 1.

* * * * *